United States Patent
Xu et al.

(10) Patent No.: US 11,152,614 B2
(45) Date of Patent: Oct. 19, 2021

(54) RANGE-EXTENDED ELECTRIC VEHICLES HAVING LITHIUM TITANATE OXIDE (LTO) BATTERY WITH SUPER HIGH CHARGE AND DISCHARGE RATES

(71) Applicant: Benjamin Yeung, Monrovia, CA (US)

(72) Inventors: Jianguo Xu, Pasadena, CA (US); Junwen Hou, Pasadena, CA (US)

(73) Assignee: Benjamin Yeung, Monrovia, CA (US)

( * ) Notice: Subject to any disclaimer, the term of this patent is extended or adjusted under 35 U.S.C. 154(b) by 311 days.

(21) Appl. No.: 16/401,184

(22) Filed: May 2, 2019

(65) Prior Publication Data

US 2019/0341608 A1 Nov. 7, 2019

Related U.S. Application Data

(60) Provisional application No. 62/666,899, filed on May 4, 2018, provisional application No. 62/666,966, filed on May 4, 2018.

(51) Int. Cl.

| | |
|---|---|
| *H02J 7/00* | (2006.01) |
| *H01M 4/485* | (2010.01) |
| *H01M 10/0525* | (2010.01) |
| *B60L 50/62* | (2019.01) |
| *B60L 7/14* | (2006.01) |
| *H01M 10/44* | (2006.01) |
| *B60L 53/00* | (2019.01) |
| *B60L 58/13* | (2019.01) |
| *B60L 7/10* | (2006.01) |
| *H01M 50/20* | (2021.01) |

(52) U.S. Cl.
CPC .............. *H01M 4/485* (2013.01); *B60L 7/10* (2013.01); *B60L 7/14* (2013.01); *B60L 50/62* (2019.02); *B60L 53/00* (2019.02); *B60L 58/13* (2019.02); *H01M 10/0525* (2013.01); *H01M 10/441* (2013.01); *H01M 50/20* (2021.01); *B60L 2240/62* (2013.01); *B60L 2240/642* (2013.01); *B60L 2240/66* (2013.01); *B60L 2240/68* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2010/0304920 A1* | 12/2010 | Simon | B60K 1/02 477/3 |
| 2011/0148354 A1* | 6/2011 | Wenger | B60K 6/36 320/109 |
| 2012/0041626 A1 | 2/2012 | Kelty et al. | |
| 2013/0066505 A1 | 3/2013 | Kelty et al. | |
| 2016/0181603 A1 | 6/2016 | Son et al. | |
| 2016/0236586 A1 | 8/2016 | Soo et al. | |
| 2016/0297408 A1 | 10/2016 | Gallagher et al. | |
| 2017/0057372 A1* | 3/2017 | Loftus | G01R 31/396 |
| 2017/0166062 A1* | 6/2017 | Simonini | B60L 7/26 |
| 2019/0359198 A1* | 11/2019 | Velderman | B60L 53/34 |

OTHER PUBLICATIONS

Korean Intellectual Property Office (ISR/KR), "International Search Report for PCT/US2019/030327", Korea, dated Aug. 9, 2019.

* cited by examiner

*Primary Examiner* — Arun C Williams
(74) *Attorney, Agent, or Firm* — Locke Lord LLP; Tim Tingkang Xia, Esq.

(57) ABSTRACT

An electric vehicle includes an electric drive component; a lithium titanate oxide battery pack comprising LTO battery cells; and a range extender. The range extender has a first state to deliver power to the electric drive component, a second state to charge the LTO battery pack, a third state to deliver power to the electric drive component and charge the LTO battery pack, and a fourth state in which it does not deliver power outward. The electric drive component has a first state to receive power delivered from the LTO battery pack, a second state to receive power delivered from the range extender, a third state to receiver power delivered from the LTO battery pack and the range extender, a fourth state to recover braking energy to charge the LTO battery pack, and a fifth state in which it does not receive power and does not recover the braking energy.

15 Claims, 14 Drawing Sheets

RANGE-EXTENDED ELECTRIC VEHICLES HAVING LITHIUM TITANATE OXIDE (LTO) BATTERY WITH SUPER HIGH CHARGE AND DISCHARGE RATES

CROSS-REFERENCE TO RELATED APPLICATION

This application claims priority to and the benefits of U.S. Provisional Patent Application Ser. Nos. 62/666,899 and 62/666,966, both filed May 4, 2018, which are incorporated by reference herein in their entireties.

FIELD OF THE INVENTION

The invention relates generally to automobiles, and more particularly, to a range-extended electric vehicle having a lithium titanate oxide (LTO) battery with super high charge and discharge rates.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Electric cars have advantages such as lower fuel costs, environmental stewardship, and energy independence. Operating range is important for electric cars. Some electric cars employ auxiliary power units (APU) known as range extenders which could charge batteries of electric cars. It is desirable to improve the operating range and efficiency of an electric car.

Therefore, a heretofore unaddressed need exists in the art to address the aforementioned deficiencies and inadequacies.

SUMMARY OF THE INVENTION

The present invention relates to apparatus and method for visualizing potential behaviors of surrounding objects of a vehicle.

In one aspect of the invention, an electric vehicle includes an electric drive component; a lithium titanate oxide (LTO) battery pack comprising LTO battery cells, electrically connected through a power distribution unit to the electric drive component; and a range extender, electrically connected through a rectifier to the LTO battery pack and the electric drive component, the range extender having a first state in which it operates to deliver power to the electric drive component, a second state in which it operates to charge the LTO battery pack, a third state in which it operates to deliver power to the electric drive component and charge the LTO battery pack, and a fourth state in which it does not deliver power outward. The electric drive component has a first state in which it operates to receive power delivered from the LTO battery pack to drive wheels of the electric vehicle, a second state in which it operates to receive power delivered from the range extender to drive the wheels, a third state in which it operates to receiver power delivered from the LTO battery pack and the range extender to drive the wheels, a fourth state in which it operates to recover braking energy to charge the LTO battery pack, and a fifth state in which it does not receive power and does not recover the braking energy.

In one embodiment, each of the LTO battery cells comprises $Li_4Ti_5O_{12}$.

In one embodiment, the LTO battery cells have a charge rate being greater than 25 C and a discharge rate being greater than 25 C.

In one embodiment, the LTO battery cells have a charge rate of 30 C and a discharge rate of 30 C.

In one embodiment, the LTO battery cells have a recharge efficiency being greater than 98%.

In one embodiment, the range extender is in the fourth state in which it does not deliver power outward, and the electric drive component is in the first state in which it operates to receive power delivered from the LTO battery pack to drive the wheels.

In one embodiment, the range extender is in the fourth state in which it does not deliver power outward, and the electric drive component is in the fourth state in which it operates to recover braking energy to charge the LTO battery pack.

In one embodiment, the range extender is in the first state in which in which it operates to deliver power to the electric drive component, and the electric drive component is in the second state in which it operates to receive power delivered from the range extender to drive the wheels.

In one embodiment, the range extender is in the third state in which it operates to deliver power to the electric drive component and charge the LTO battery pack, and the electric drive component is in the second state in which it operates to receive power delivered from the range extender to drive the wheels.

In one embodiment, the range extender is in the first state in which it operates to deliver power to the electric drive component, and the electric drive component is in the third state in which it operates to receiver power delivered from the LTO battery pack and the range extender to drive the wheels.

In one embodiment, the range extender is in the second state in which it operates to charge the LTO battery pack, and the electric drive component is in the fourth state in which it operates to recover braking energy to charge the LTO battery pack.

In one embodiment, the range extender is in the second state in which it operates to charge the LTO battery pack, and the electric drive component is in the fifth state in which it does not receive power and does not recover the braking energy.

In one embodiment, the range extender is one of an internal combustion engine (ICE) range extender, a fuel-cell range extender, and a microturbine range extender.

In another aspect of the invention, an architecture of the electric vehicle mentioned above is configured to accommodate any one of the ICE range extender, the fuel-cell range extender, and the microturbine range extender.

In one embodiment, the architecture of the electric vehicle includes a rectangular cuboid space in a front part for accommodating any one of the ICE range extender, the fuel-cell range extender, and the microturbine range extender.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
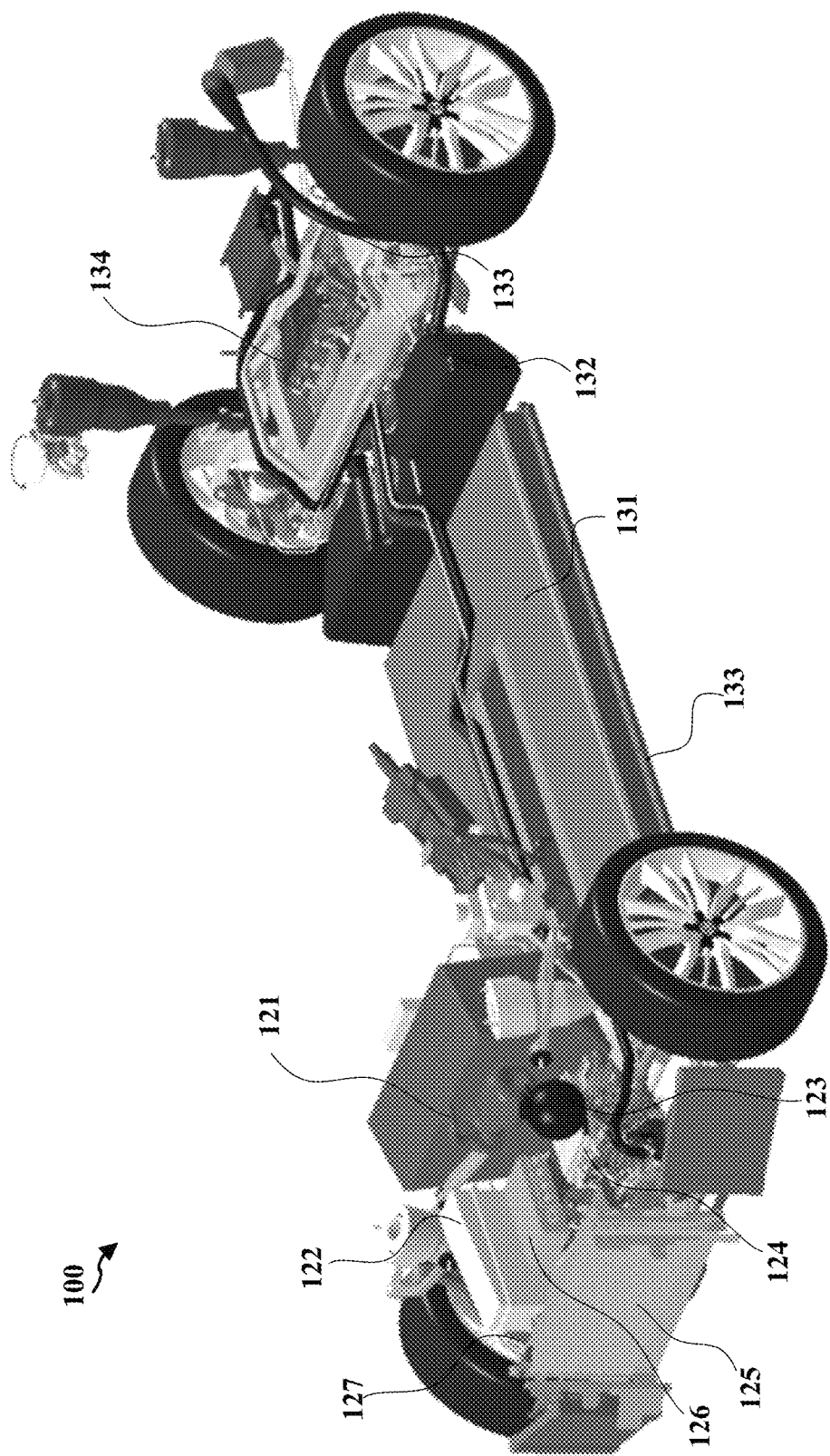
FIG. 1 shows schematically a range-extended electric vehicle with super high charge and discharge rate LTO battery according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Referring to FIG. 1, a range-extended electric vehicle with super high charge and discharge rate lithium titanate oxide (LTO) battery (LTO battery) is schematically shown according to embodiments of the invention.

In the exemplary embodiments shown in FIG. 1, the range-extended electric vehicle 100 includes a range extender 121. Surrounding the range-extender 121 under the hood, there is a heating, ventilation, and air conditioning (HVAC) module 122 in front which is normally found behind the dash in a typical non-electric vehicle's interior. The HVAC module 122 provides thermal comfort and acceptable air quality in the range-extended electric vehicle 100. A coolant bottle 123, a cooling module 125, and a power distribution unit (PDU) 126 are all positioned in the front of the range-extender 121.

A 12-volt battery 133 to power the vehicle's onboard electronics is located in the rear of the range-extended electric vehicle 100. A gas tank (or hydrogen tank) 132 is positioned in the rear of the range-extended electric vehicle 100. The range-extended electric vehicle 100 further includes two electric drive components 124 and 134 for all-wheel drive, each including an electric motor, a transmission and power electronics, etc. Gearbox is housed in single units with the electric motors, as well as with the power electronics that convert DC current from the LTO battery pack to AC current for the motors. In other configurations, the electric drive component 134 is located only in the rear for rear-wheel drive.

The range-extended electric vehicle 100 is configured with designed flat, rectangular lithium titanate oxide (LTO) battery pack 131, in either rear-wheel drive or all-wheel drive. The LTO battery pack 131 is bolted beneath the floor of the range-extended electric vehicle 100. The battery pack 131 includes LTO battery cells. Each of the LTO battery cells comprises $Li_4Ti_5O_{12}$. The $Li_4Ti_5O_{12}$ battery cells have extremely long lifetime, enhanced safety, low-temperature performance and large potential. In one embodiment, each $Li_4Ti_5O_{12}$ battery cell has lithium-titanate nanocrystals with increased surface area that are especially designed to enhance the lifetime of the battery cell. For example, with an over 30 times larger surface area, the $Li_4Ti_5O_{12}$ battery cell is able to recharge substantially faster than its more traditional alternative, the Li-Ion battery. The cycle count of the $Li_4Ti_5O_{12}$ battery is 20,000 in comparison of only 2000 in a regular lithium battery, marking a revolutionary approach to energy storage.

The LTO battery cells have a very high discharge rate (30 C), and is capable of instantly discharging high-power electrical energy. Therefore, the configuration of a small-capacity battery can meet the high-power requirements of the range-extended electric vehicle 100, and achieve excellent acceleration performance. In other words, the LTO battery cells are capable of delivering high power as required in short time with small size battery to meet the power demand of the range-extended electric vehicle 100.

The high charge rate (30 C) of the LTO battery cells can not only recover all instantaneous high power braking energy, but also can receive all excess energy in addition to the instantaneous power required by the vehicle operation in the range of efficient constant power of the range extender 121. With the high charge rate, the LTO battery cells have advantages in fast charging (within a few minutes depending on battery size in charging station, fully regenerative braking energy recovery, and being charged in high power by on-board range extenders like the range extender 121). Therefore, the system efficiency is very high.

Another advantage of the $Li_4Ti_5O_{12}$ battery is that due to the nanotechnology employed, the battery has a much better low-temperature performance in comparison to other battery technologies. Due to these low-temperature discharge characteristics, it is able to obtain up to 80% of its full capacity at a mere −30° C. According to the invention, the LTO battery cells on the range-extended electric vehicle 100 can be used in in a wider operating temperature range (−30° C. to 55° C.) and with high recharge efficiency exceeding 98%, compared to other carbon based batteries. LTO battery cells have other benefits ranging from long lifetime to enhanced safety.

Figure 2:
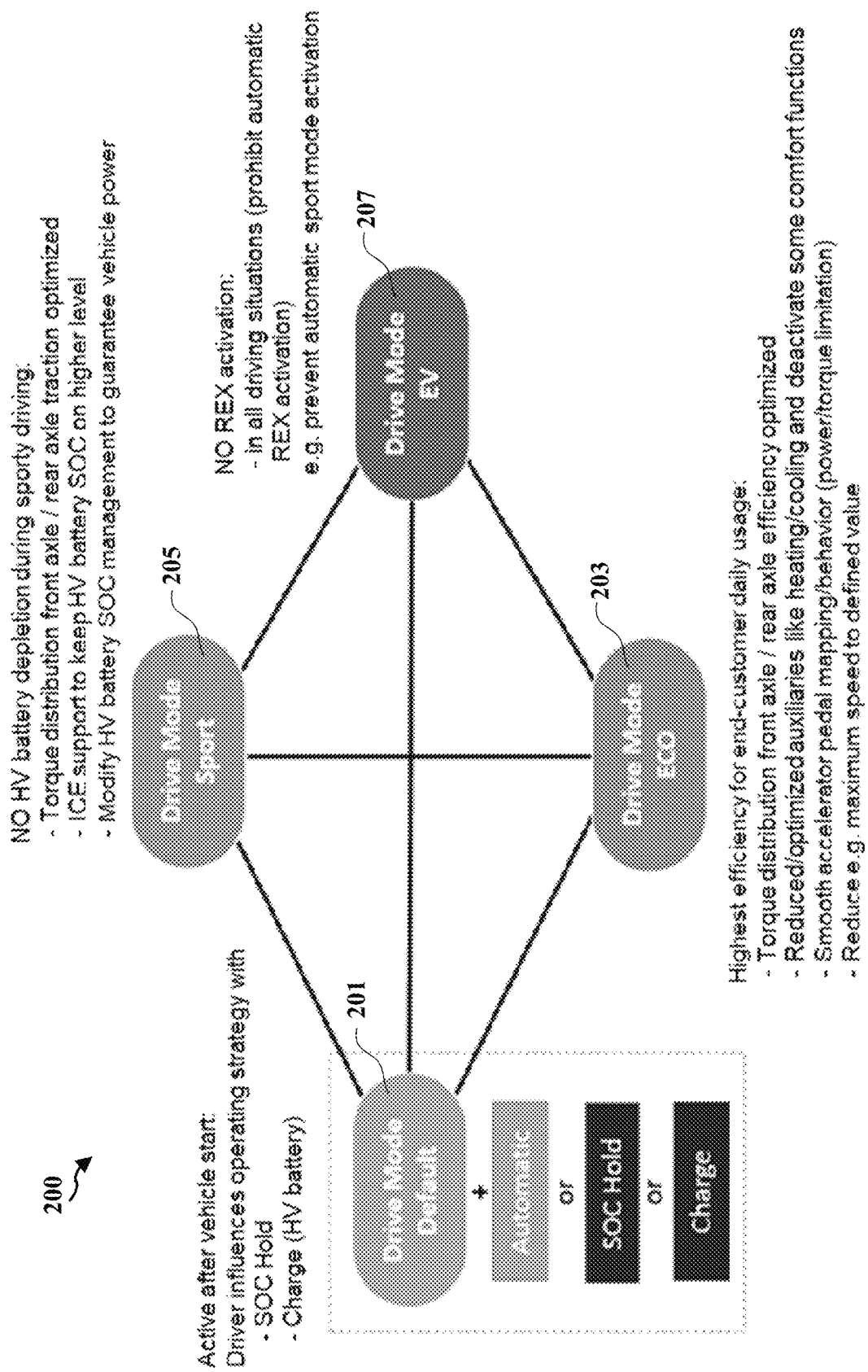
FIG. 2 shows schematically four drive modes of the range-extended electric vehicle with super high charge and discharge rate LTO battery according to embodiments of the invention.

Referring to FIG. 2, four drive modes of the range-extended electric vehicle 100 with super high charge and discharge rate LTO battery are schematically shown according to embodiments of the invention.

In the exemplary embodiments shown in FIG. 2, the range-extended electric vehicle 100 have four drive modes: a default mode 201, an economic (ECO) mode 203, a sport mode 205 and a purely electric mode 207. Generally speaking, the default mode 201 is the basic mode, and the other three modes 203, 205 and 207 are selected by the driver according to driving conditions and requirements. Each of the four modes 201, 203, 205 and 207 realizes the characteristics of high charge rate and discharge rate of the LTO battery cells.

When the driver starts the range-extended electric vehicle 100, the default mode 201 is automatically selected. There is an automatic setting in the basic operating mode, and the driver chooses to activate the range extender 121 to maintain the battery state of charge (SOC) between two preset thresholds (i.e., an upper threshold and a lower threshold), and the driver initiates the range extender 121 charging mode as needed. The driver's foot on the accelerator pedal produces good acceleration and driving comfort. When the accelerator pedal is released, the vehicle automatically decelerates to recover the braking energy to ensure the smoothness of the vehicle. Only when the driver actively steps on the brake pedal will the vehicle stop faster, otherwise there will be no friction brake intervention. According to the LTO battery pack 131 state of charge, the range extender 121 is automatically started and turned off, and the range extender 121 always works in the optimal efficiency working range. Under the condition that the electric drive components 124 and 134 are required to provide the required power, the excess power is fully charged in an instant and goes to the LTO battery pack 131. The switching between the LTO battery pack 131 and range extender 121 as the power source is achieved according to a method of maximizing system efficiency.

To achieve maximum efficiency, the driver may choose the ECO mode 203. The control strategy under the ECO mode 203 is to optimize the power distribution of the front and rear axles according to driving conditions, limit and optimize the power and demand of the auxiliary equipment, and achieve the appropriate acceleration performance and maximum speed by limiting the driving power and torque.

To achieve excellent sporting performance (acceleration and grade ability), the driver may choose the sport mode 205. The control strategy under the sport mode 205 will reasonably allocate and optimize the traction of the front and rear axles. When the range extender 121 works in the optimal efficiency interval, it will provide the high power required by the range-extended electric vehicle 100 and maintain the power required for the LTO battery state of charge to be in the optimal set interval state. The battery pack 131 provides the instantaneous high power required for the electric drive components 124 and 134 at any time to meet the dynamic performance requirements of the range extended electric vehicle 100.

When driving in the city, the driver may choose the purely electric mode 207, the range extender 121 will remain off and will not start automatically. When the LTO battery state of charge is lower than the set threshold, the high charge rate of LTO battery cells of the LTO battery pack 131 ensures that a full charge can be achieved in 10 minutes.

Compare with other extended-range electric vehicles on the market, the range-extended electric vehicle 100 with super high charge and discharge rate LTO battery has many benefits. First, the range-extended electric vehicle 100 configures a small-capacity battery, and the LTO battery pack 131 outputs instant high power and continuous high power, and the power performance of the range-extended electric vehicle 100 is superior. Second, the range-extended electric vehicle 100 can realize instantaneous high-power braking energy recovery, and the braking energy recovery efficiency is high. Third, the range extender 121 operates at high efficiency and constant power, and the power generated by the range extender 121 enables the range-extended electric vehicle 100 to travel while the excess power is fully charged to the LTO battery pack 131. Fourth, the range-extended electric vehicle 100 can be fully charged in 10 minutes.

Referring to FIGS. 3-11, energy flow in different situations are schematically shown according to embodiments of the invention.

Figure 3:
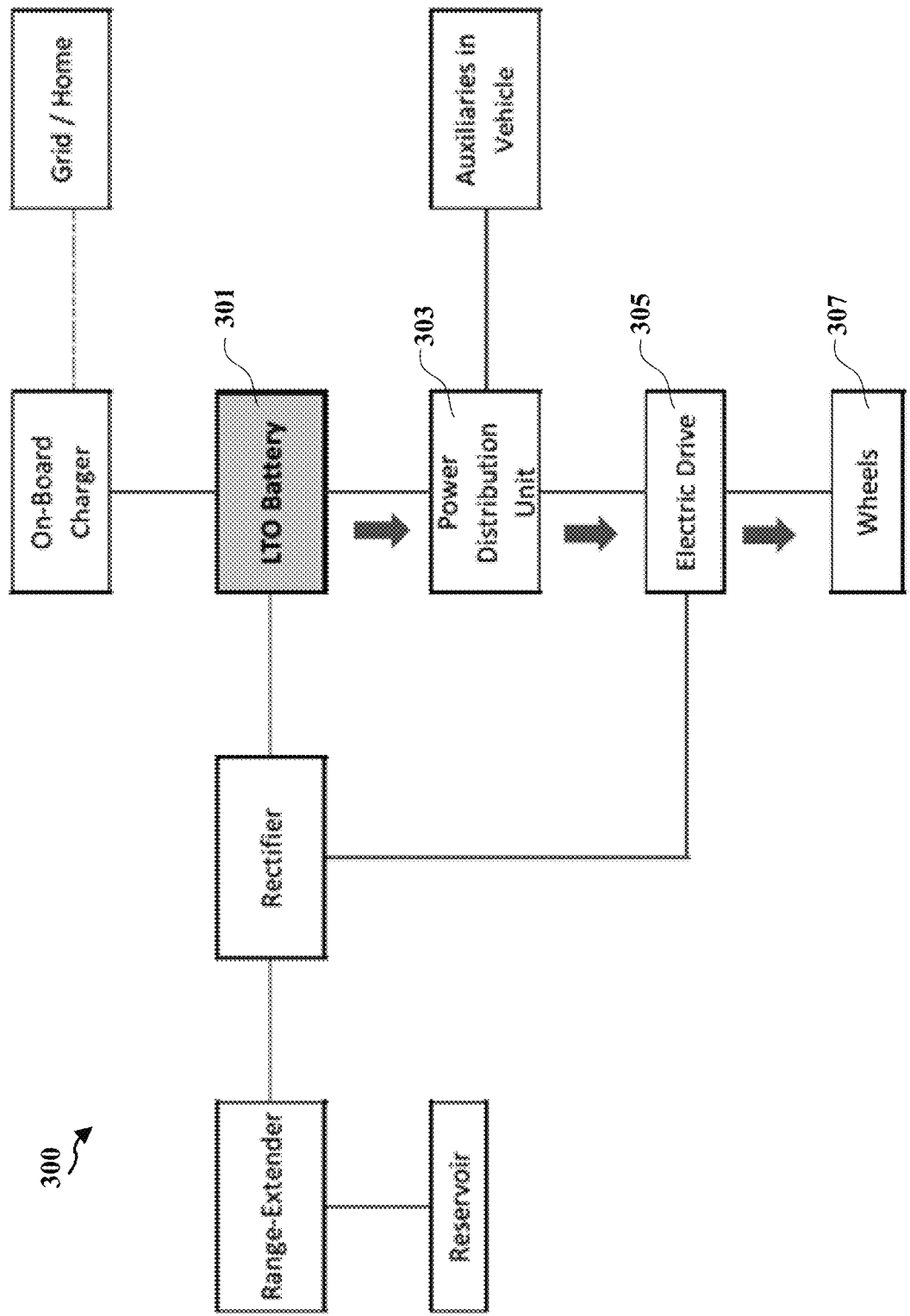
FIG. 3 shows schematically energy flow of the range-extended electric vehicle in one situation according to embodiments of the invention.

In the exemplary embodiment shown in FIG. 3, the range-extended electric vehicle 100 is only powered by the LTO battery pack 301. Specifically, a LTO battery pack 301 delivers power to a power distribution unit 303. The power distribution unit 303 then delivers power to an electric drive component 305, which in turn drives wheels 307 of the range-extended electric vehicle 100. In this situation, the range-extended electric vehicle 100 is only powered by the LTO battery pack 301, and the energy flows form the LTO battery pack 301, through the power distribution unit 303 and the electric drive component 305, to the wheels 307.

Figure 4:
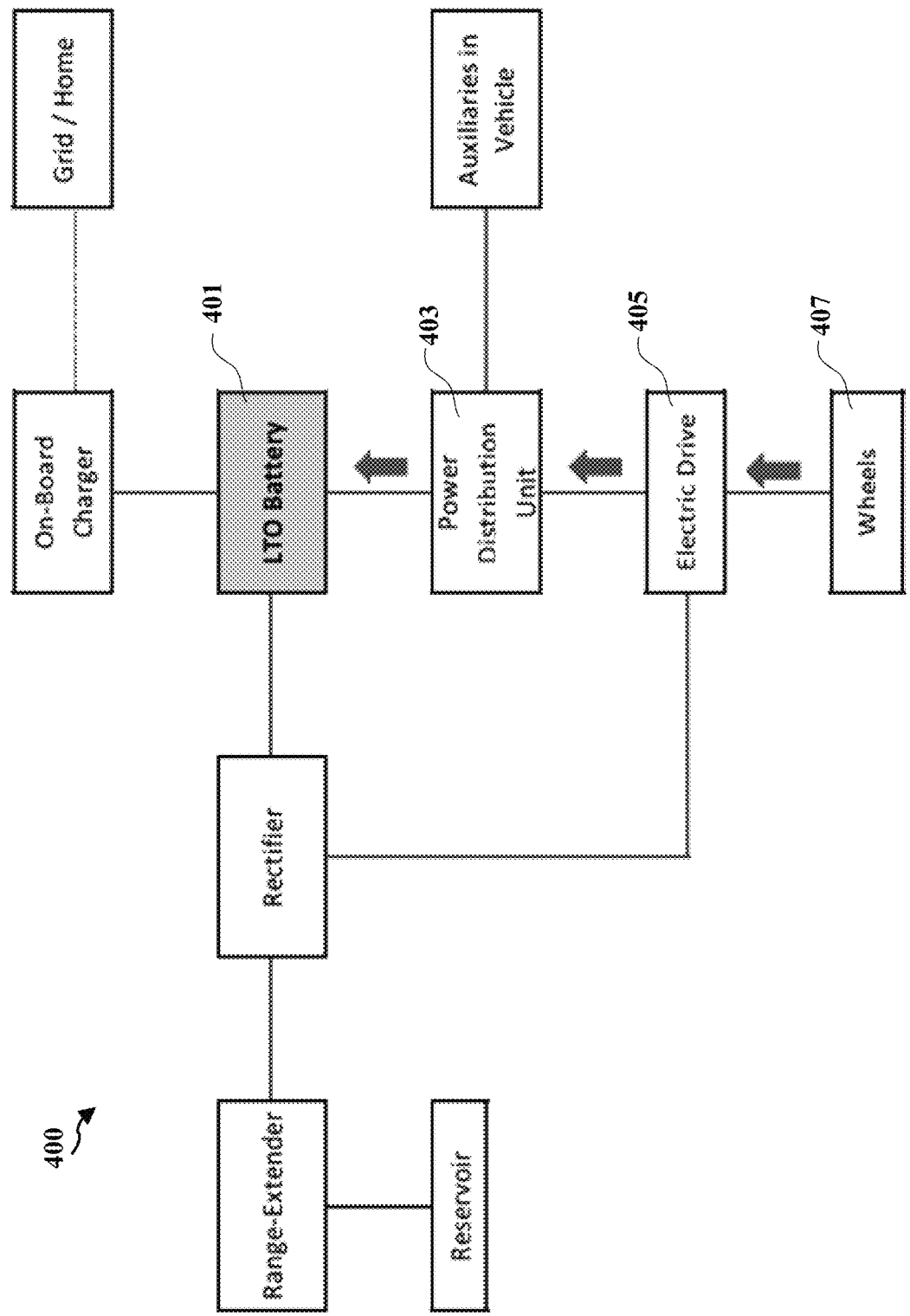
FIG. 4 shows schematically energy flow of the range-extended electric vehicle in another situation according to embodiments of the invention.

In the exemplary embodiment shown in FIG. 4, the range-extended electric vehicle 100 is in a situation of fast regenerative braking energy recovery. Specifically, when the driver steps on the braking pedal, the range-extended electric vehicle 100 decelerates to recover the braking energy. In other situations such as when the range-extended electric vehicle 100 is in sliding condition on a downhill road, the range-extended electric vehicle 100 also decelerates to recover the braking energy. In other words, the energy is delivered from wheels 407 to an electric drive component 405. The electric drive component 405 further delivers the energy to a power distribution unit 403, which in turn charges a LTO battery pack 401. In this situation, the braking energy is transformed and used to charge the LTO battery pack 401.

Figure 5:
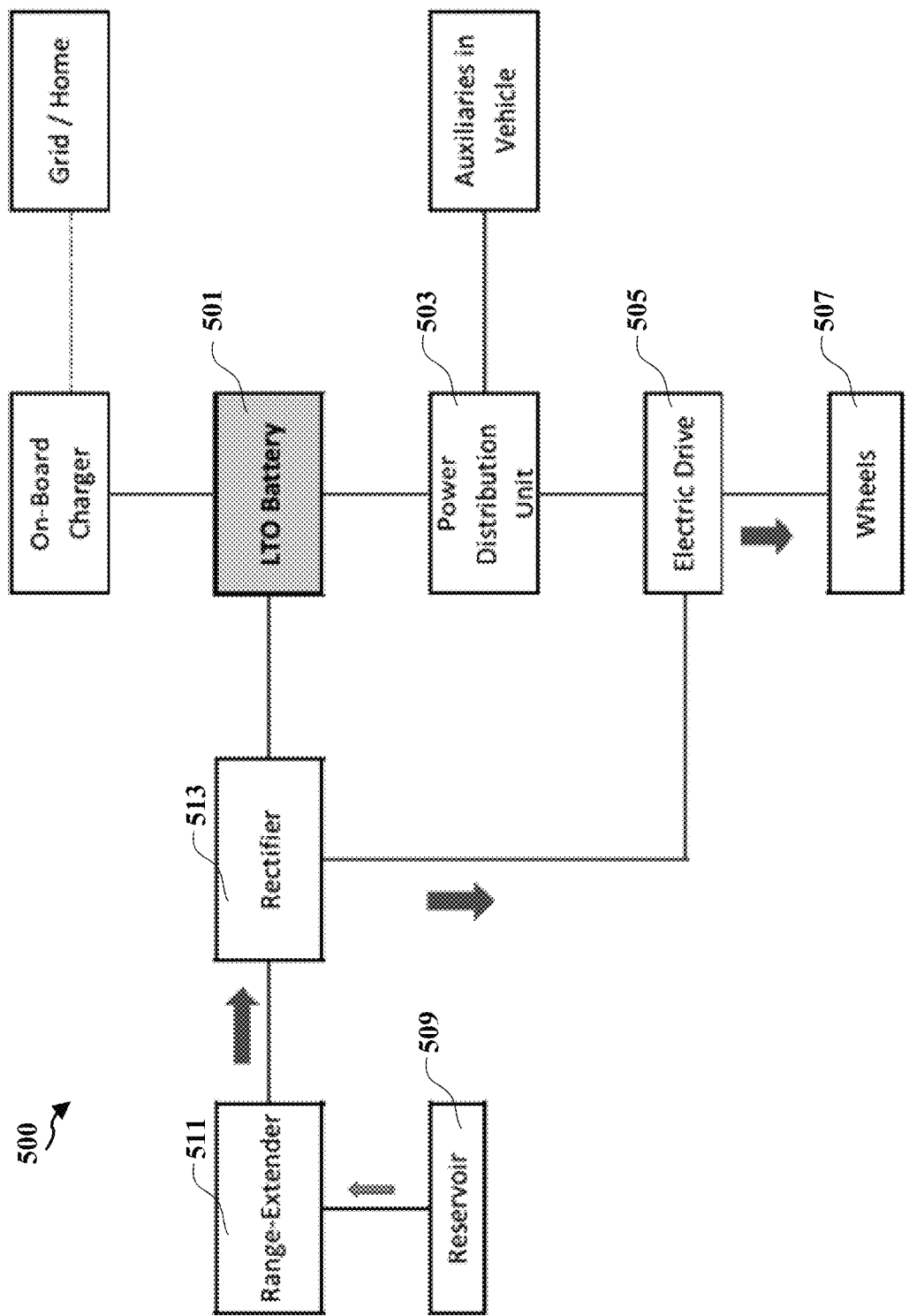
FIG. 5 shows schematically energy flow of the range-extended electric vehicle in yet another situation according to embodiments of the invention.

In the exemplary embodiment shown in FIG. 5, the range-extended electric vehicle 100 is powered by a range extender 511 only. Specifically, a LTO battery pack 501 does not deliver power to a power distribution unit 503. Instead, power saved in a reservoir 509 is delivered to the range extender 511. The range extender 511 delivers, through a rectifier 513, power to an electric drive component 505, which in turn drives wheels 507 of the range-extended electric vehicle 100. In this situation, the range-extended electric vehicle 100 is only powered by the range extender 511 and the reservoir 509, and the energy flows from the reservoir 509, through the range extender 511, the rectifier 513 and the electric drive component 505, to the wheels 507.

In the exemplary embodiment shown in FIG. 5, the range-extended electric vehicle 100 is powered by a range extender 511 only. Specifically, a LTO battery pack 501 does not deliver power a power distribution unit 503. Instead, power saved in a reservoir 509 is delivered to the range extender 511. The range extender 511 delivers, through a rectifier 513, power to an electric drive component 505, which in turn drives wheels 507 of the range-extended electric vehicle 100. In this situation, the range-extended electric vehicle 100 is only powered by the range extender 511 and the reservoir 509, and the energy flows form the reservoir 509, through the reservoir 509, the range extender 511, the rectifier 513 and the electric drive component 505, to the wheels 507.

Figure 6:
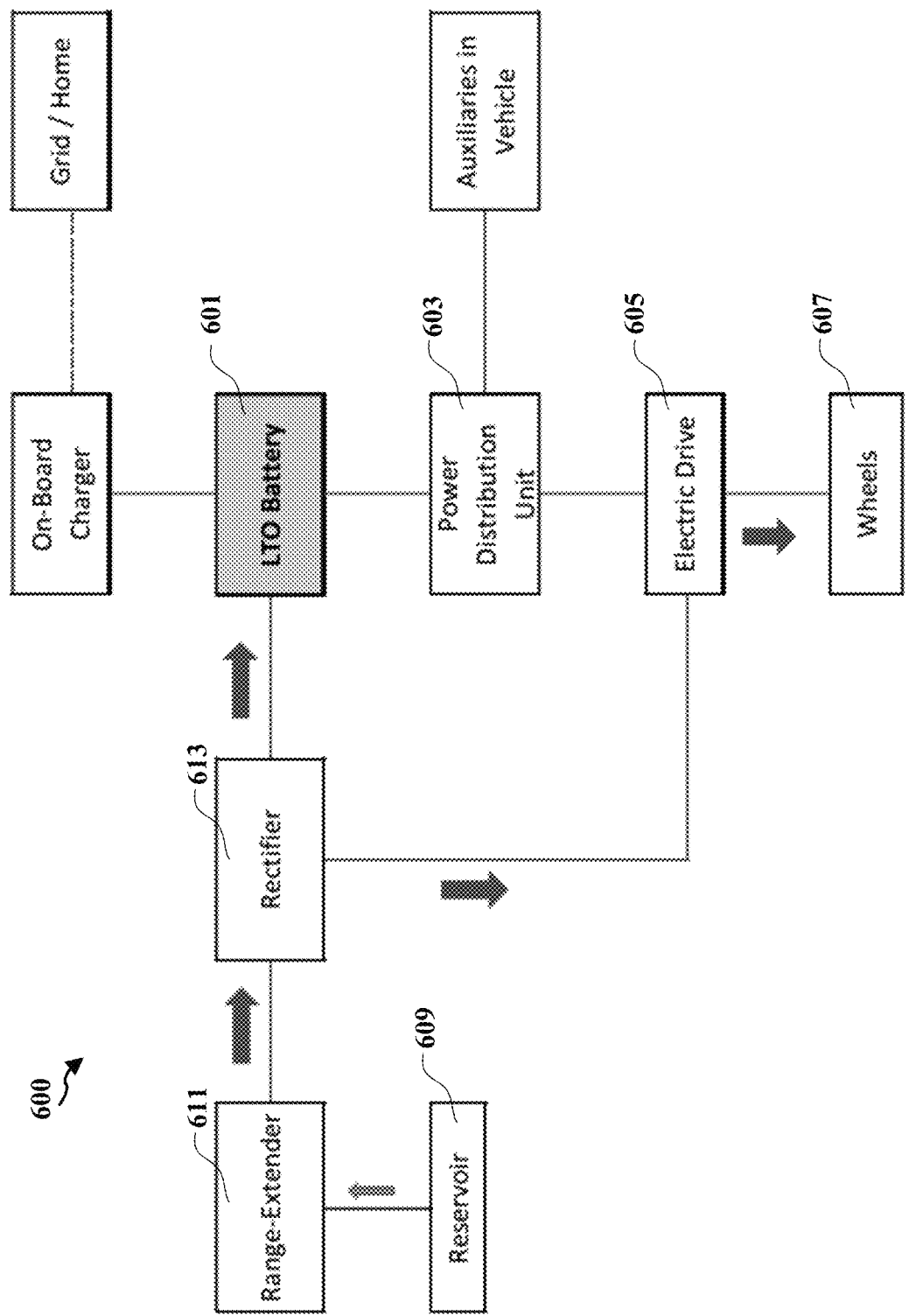
FIG. 6 shows schematically energy flow of the range-extended electric vehicle in yet another situation according to embodiments of the invention.

In the exemplary embodiment shown in FIG. 6, the range-extended electric vehicle 100 is in a situation that the range extender 611 provides power to both wheels 607 and a LTO battery pack 601. Specifically, power saved in a reservoir 609 is delivered to the range extender 611. The range extender 611 delivers, through a rectifier 613, power to both an electric drive component 605 and the LTO battery pack 601. The electric drive component 605 in turn drives wheels 607 of the range-extended electric vehicle 100. The power delivered to the LTO battery pack 601 is used to charge the LTO battery pack 601. In this situation, the range-extended electric vehicle 100 is powered by the range extender 611 and the reservoir 609, and the energy flows from the reservoir 609, through the range extender 611, the rectifier 613, to the electric drive component (and finally to the wheels 607) and the LTO battery pack 601.

Figure 7:
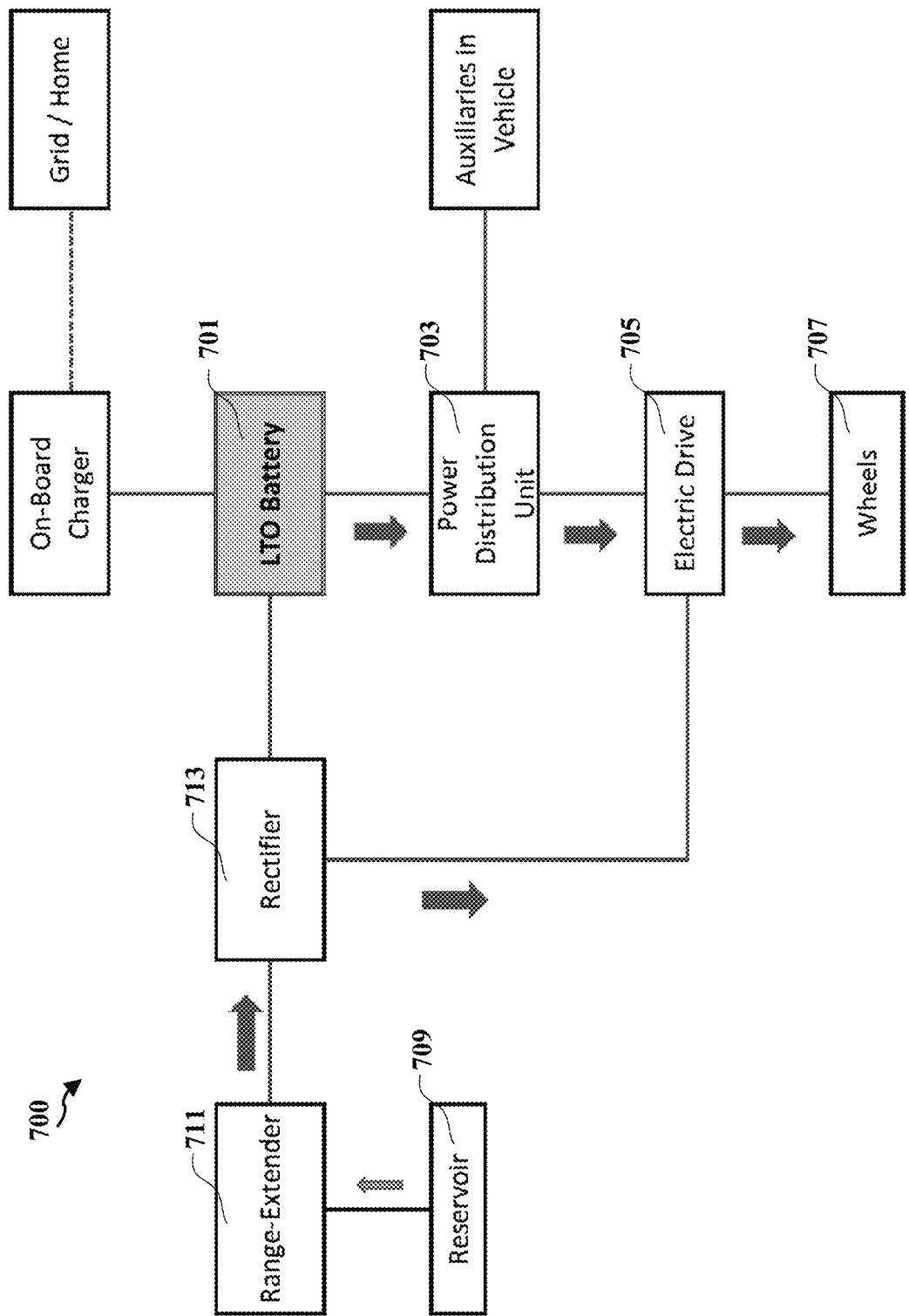
FIG. 7 shows schematically energy flow of the range-extended electric vehicle in yet another situation according to embodiments of the invention.

In the exemplary embodiment shown in FIG. 7, the range-extended electric vehicle 100 is in a situation that both a range extender 711 and a LTO battery pack 701 provide power to wheels 707. Specifically, on one hand, power saved in a reservoir 709 is delivered to the range extender 711. The range extender 711 delivers, through a rectifier 713, power to an electric drive component 705. On the other hand, the LTO battery pack 701 delivers power to a power distributor unit 703, which in turn delivers the power to the electric drive component 705. The electric drive component 705 drives wheels 707 of the range-extended electric vehicle 100. In this situation, the range-extended electric vehicle 100 is powered by both the range extender 711 and the LTO battery pack 701, and the energy flows from both the reservoir 709 and the LTO battery pack to the wheels 707.

Figure 8:
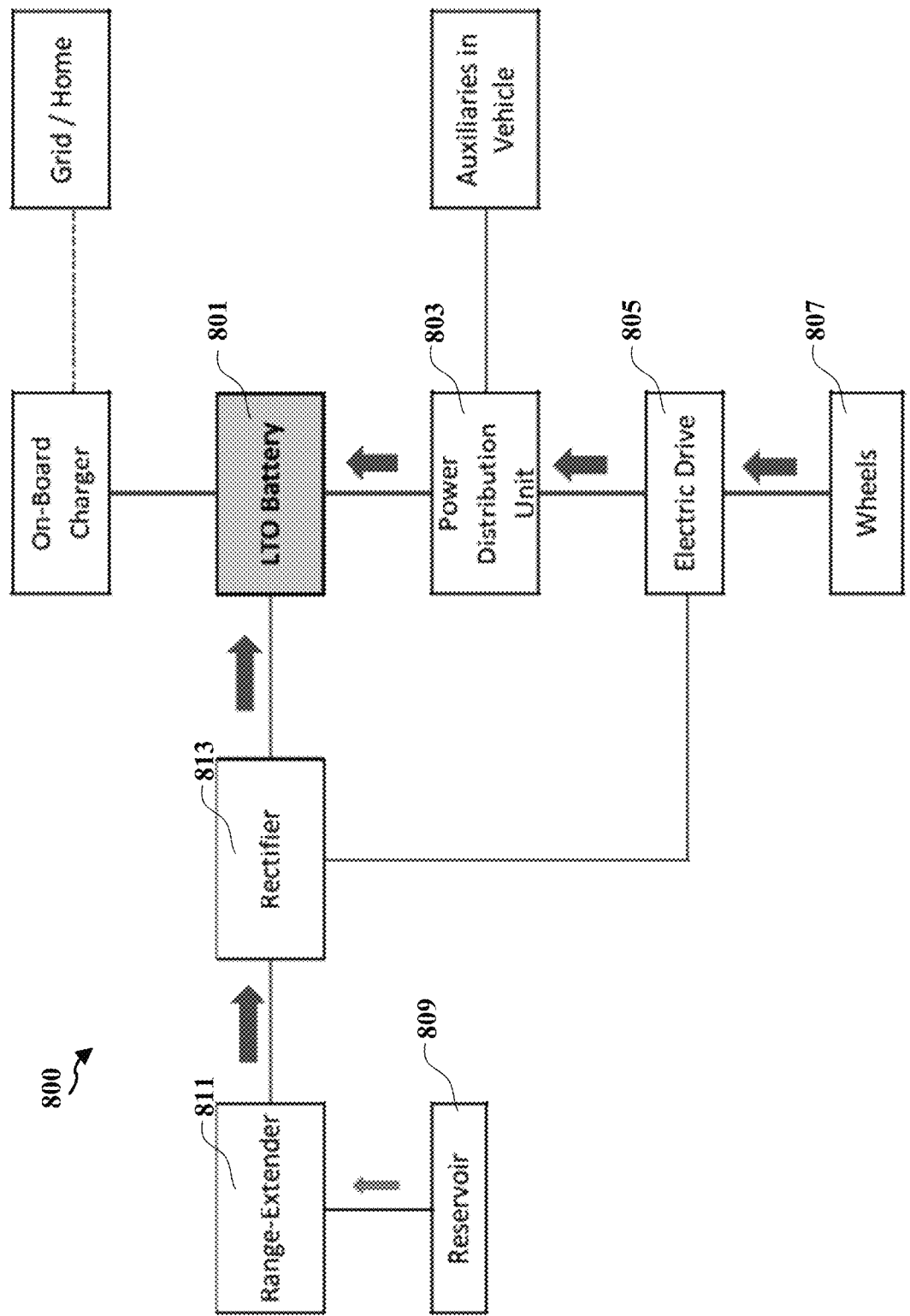
FIG. 8 shows schematically energy flow of the range-extended electric vehicle in yet another situation according to embodiments of the invention.

In the exemplary embodiment shown in FIG. 8, the range-extended electric vehicle 100 is in a situation that both a range extender 811 and regenerative braking energy from wheels 807 are used to charge a LTO battery pack 801. Specifically, on one hand, power saved in a reservoir 809 is delivered to the range extender 811. The range extender 811 delivers, through a rectifier 813, power to the LTO battery pack 801. On the other hand, when the driver steps on the pedal, the range-extended electric vehicle 100 decelerates to recover the braking energy. In other words, the energy is delivered from wheels 807 to an electric drive component 805. The electric drive component 805 further delivers the energy to a power distribution unit 803, which in turn charges the LTO battery pack 801. In this situation, both the power from the range extender 811 and the regenerative braking energy are used to charge the LTO battery pack 801.

Figure 9:
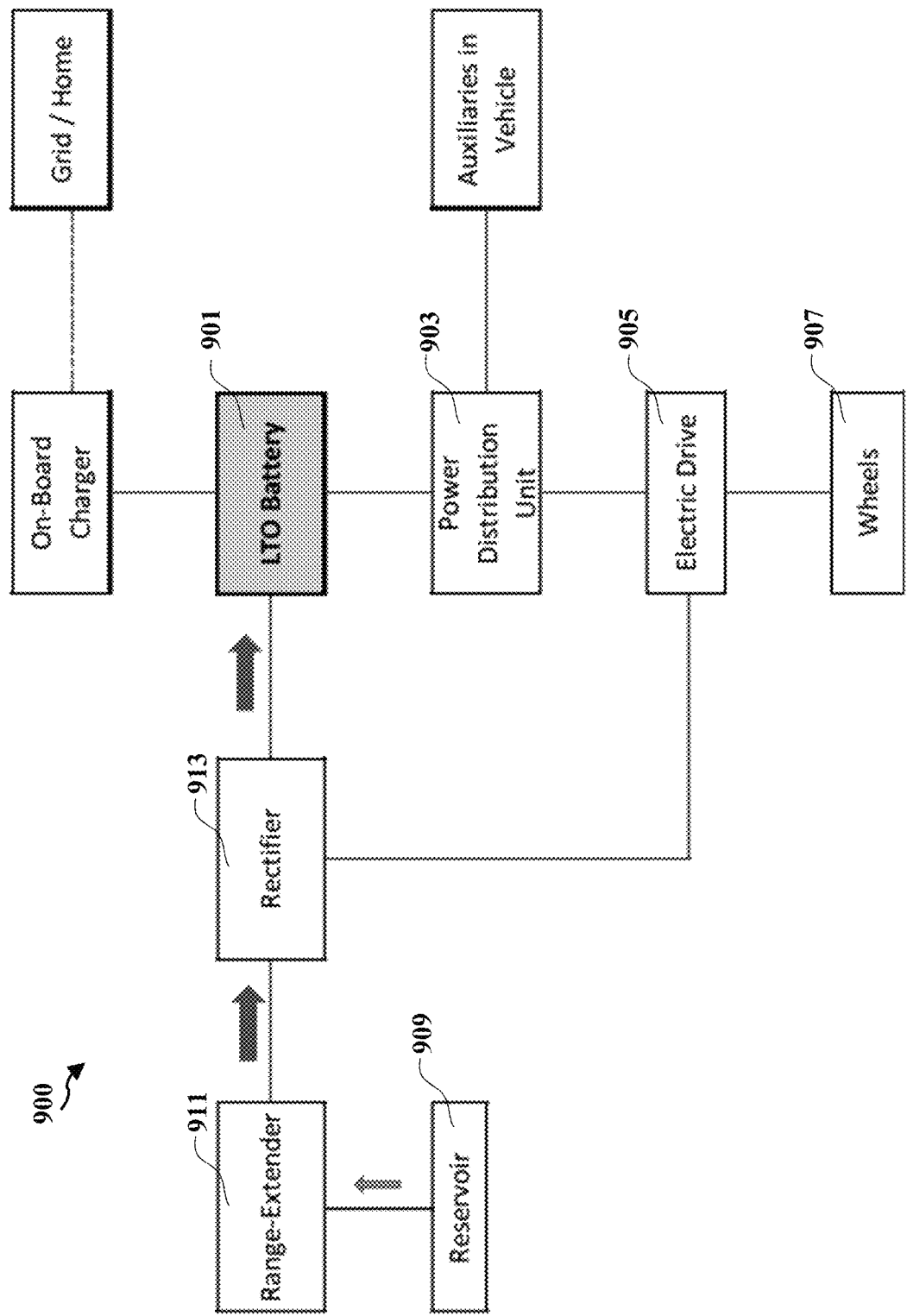
FIG. 9 shows schematically energy flow of the range-extended electric vehicle in yet another situation according to embodiments of the invention.

In the exemplary embodiment shown in FIG. 9, the range-extended electric vehicle 100 is in a parking position and a range extender 911 is used to charge a LTO battery pack 901. Specifically, power saved in a reservoir 909 is delivered to the range extender 911. The range extender 911 delivers, through a rectifier 913, power to the LTO battery pack 901. In this situation, the range extender 911 is used to charge the LTO battery pack 901.

Figure 10:
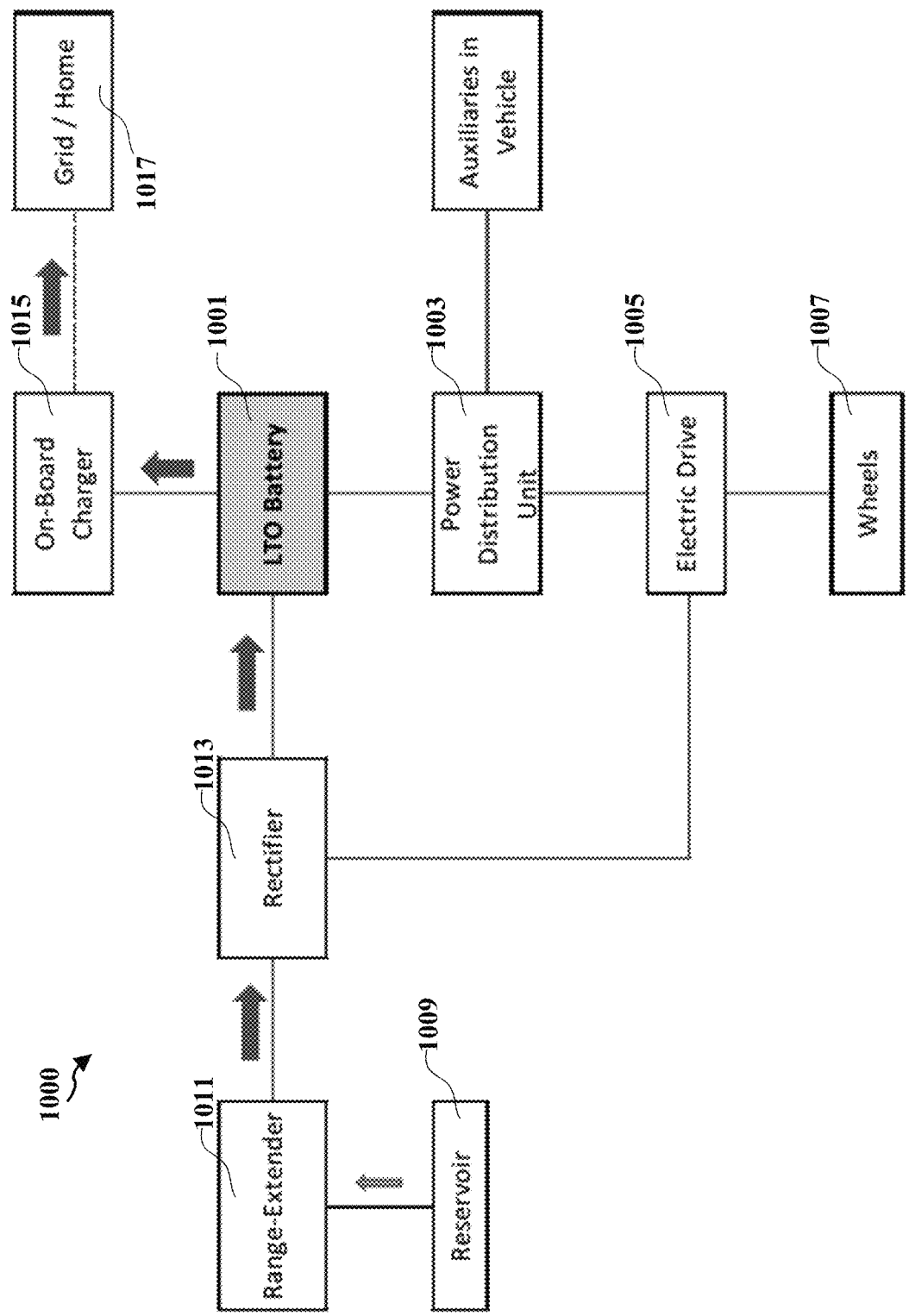
FIG. 10 shows schematically energy flow of the range-extended electric vehicle in yet another situation according to embodiments of the invention.

In the exemplary embodiment shown in FIG. 10, the range-extended electric vehicle 100 is in situation that a range extender 911 is used to generate power to grid or home 1017. Specifically, power saved in a reservoir 1009 is delivered to the range extender 1011. The range extender 1011 delivers, through a rectifier 1013, power to a LTO battery pack 1001. The LTO battery pack 1001 may deliver power to an on-board charger 1015, which may further deliver power to grid or home 1017. In this situation, the range extender 1011 is used to generate power to grid or home 1017.

Figure 11:
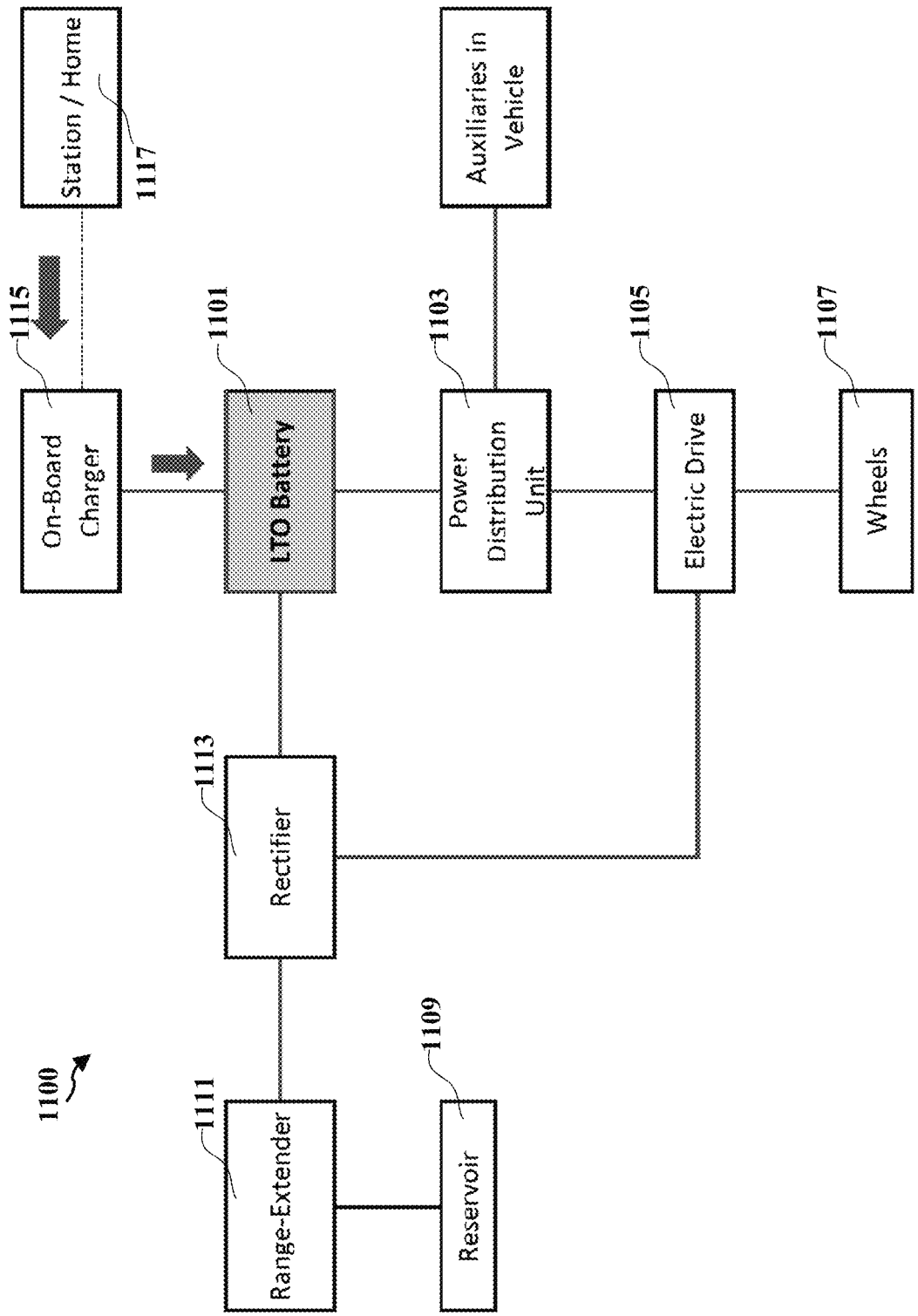
FIG. 11 shows schematically energy flow of the range-extended electric vehicle in yet another situation according to embodiments of the invention.

In the exemplary embodiment shown in FIG. 11, the range-extended electric vehicle 100 is in situation that a LTO battery pack 1101 is under fast charging at charging station or home 1117. Specifically, at the charging station or home 1117, the LTO battery pack 1101 is charged through an on-board charger 1115. In this situation, the energy from the charging station or home 1117 is delivered through the on-board charger 115 to the LTO battery pack 1101 for fast charging.

Due to the powerful LTO battery cells of the LTO battery pack 131, the range-extended electric vehicle 100 may obtain pure electric driving behavior (i.e., in the purely electric mode 207) and high power feeling, especially having silent and smooth operation in inner cities. On the other hand, the range-extended electric vehicle 100 may have powerful driving behavior while having high driving range.

The four different drive modes (i.e., the default mode 201, the ECO mode 203, the sport mode 205 and the purely electric mode 207) may guarantee high-end customer benefit from efficiency to sporty handling. The driver can manually influence the operating strategy based on his need (e.g., different drive modes, charging battery, and holding energy level of battery).

The range-extended electric vehicle 100 also adopts an adaptive vehicle operating strategy based on the driver's driving profile to support driving behavior and highest efficiency of the range-extended electric vehicle 100. Based on average of previous drives (e.g., short-range, mid-range, or long-range), the appropriate operating will be adopted and optimized automatically.

The range-extended electric vehicle 100 supports both four-wheel drive (4WD) and two-wheel drive (2WD). Two-wheel drive is typically used for the ECO mode 203, while four-wheel drive is used when there is high power demand. To increase vehicle traction results in intelligent torque shifting.

Operating strategy of the range extender 121 supports vehicle power to vehicle ($VP2^V$), vehicle power to grid ($VP2^G$), and vehicle power to home ($VP2^H$).

Through connected car interface, the range-extended electric vehicle 100 is connected to the driver's cell phone control and is capable of monitoring $VP2^V$, $VP2^G$, $VP2^H$ and start charging, stop charging, preconditioning charging of the range-extended electric vehicle 100 from the grid. Information like charging status, vehicle position (e.g., by means of Google Maps) are available on the driver's cell phone.

Besides, high comfort guaranteed according creeper mode and adjustable coasting characteristic lead to from one pedal drive (i.e., acceleration and deceleration adjusted via accelerator pedal; high deceleration) to mimic conventional vehicle (low deceleration during coasting).

Figure 12:
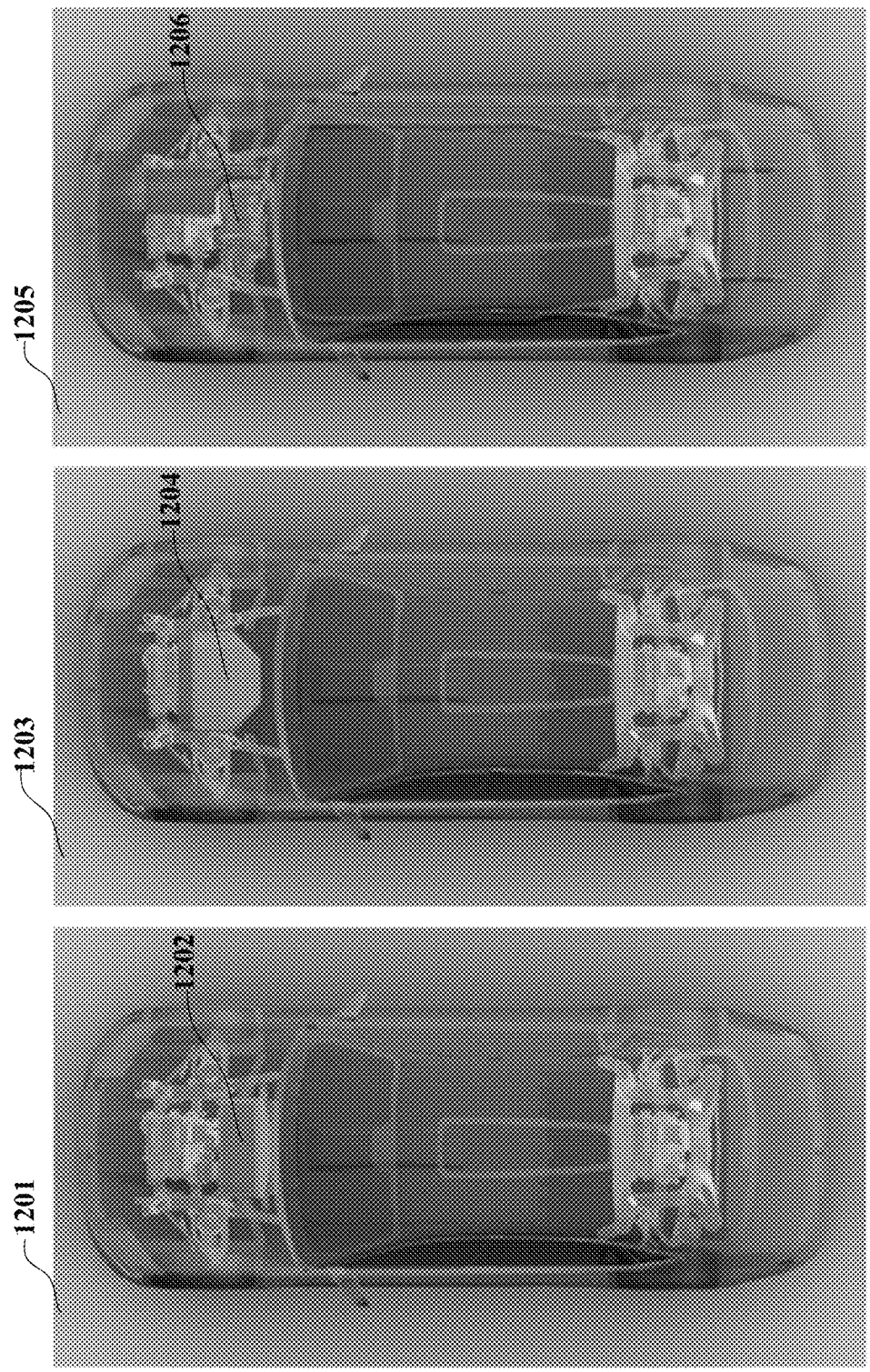
FIG. 12 shows schematically a vehicle architecture for adapting different range extenders according to embodiments of the invention.

Additionally, the architecture of the range-extended electric vehicle 100 is designed to adapt with different types of range extenders that occupies the same space in the front part (i.e., traditional engine compartment) of the range-extended electric vehicle 100. Referring to FIG. 12, a vehicle architecture for adapting different range extenders are schematically shown according to embodiments of the invention. Specifically, FIG. 12 schematically shows a vehicle architecture capable of accommodating an internal combustion engine (ICE) range extender 1202, a fuel-cell range extender 1204, and a microturbine range extender 1206.

The space for one of those range extenders 1202, 1204 and 1206 is defined simply as a rectangular cuboid, in which the main body of one of those range extenders 1202, 1204 and 1206 is contained. In other words, the architecture of the range-extended electric vehicle 100 is configured to accommodate any one of the ICE range extender 1202, the fuel-cell range extender 1204, and the microturbine range extender 1206. At the time of purchase or order, customers can simply select, without additional adjustment cost, a type of range extender among the three types: the ICE range extender 1202, the fuel-cell range extender 1204, and the microturbine range extender 1206. Because the architecture of the range-extended electric vehicle 100 is configured to accommodate any one of the three types of range extenders, no architecture change is necessary. After the purchase, customers can request to replace one type of range extender with another type of range extender. On the other hand, the range-extended electric vehicle 100 with different types of range extenders may share the same production line, thus reducing manufacturing cost.

More specifically, the length (L) of the rectangular cuboid fits in between vehicle sub-frame in the transvers direction, the depth (W) is in the longitude direction of the range-extended electric vehicle, and the height (H) is positioned with both clearance under hood and above ground. L, W, and H are determined and optimized based on engine bay space constrains in which all components are to be packaged, all functional clearance requirements, and manufacturing process requirements. The position of the electric drive component 124 has to be positioned towards the front of the vehicle as much as possible to provide maximum space for the range extender 121. Functional clearances are calculated and optimized based on component functional and performance requirements. To ensure all assembly process of front suspension, and no interference, the minimum clearance between front suspension and one of those range extenders 1202, 1204 and 1206 are determined and guaranteed.

All other main components and chassis are designed and packaged around the range extender 1202, 1204, or 1206 to simplify the design and construction of multiple different vehicles by using many common components, such as suspension sub-frame, steering column, and shape of the hood. Other components such as HVAC module, power distribution unit, and electric drive component are arranged in the same manner as shown in FIG. 1. For fuel-cell range extender 1204, there is no exhaust system. For microturbine range extender 1206, the exhaust pipes 133 are positioned on both sides of the LTO battery pack 131 from front to rear. For ICE range extender 1202, the exhaust pipe 133 exists on only one side of the LTO battery pack 131 from front to rear.

For fuel-cell range extender 1204, there is no exhaust system. For microturbine range extender 1206, the exhaust pipes 133 are positioned on both sides of the LTO battery pack 131 from front to rear. For ICE range extender 1202, the exhaust pipe 133 exists on only one side of the LTO battery pack 131 from front to rear.

Figure 13:
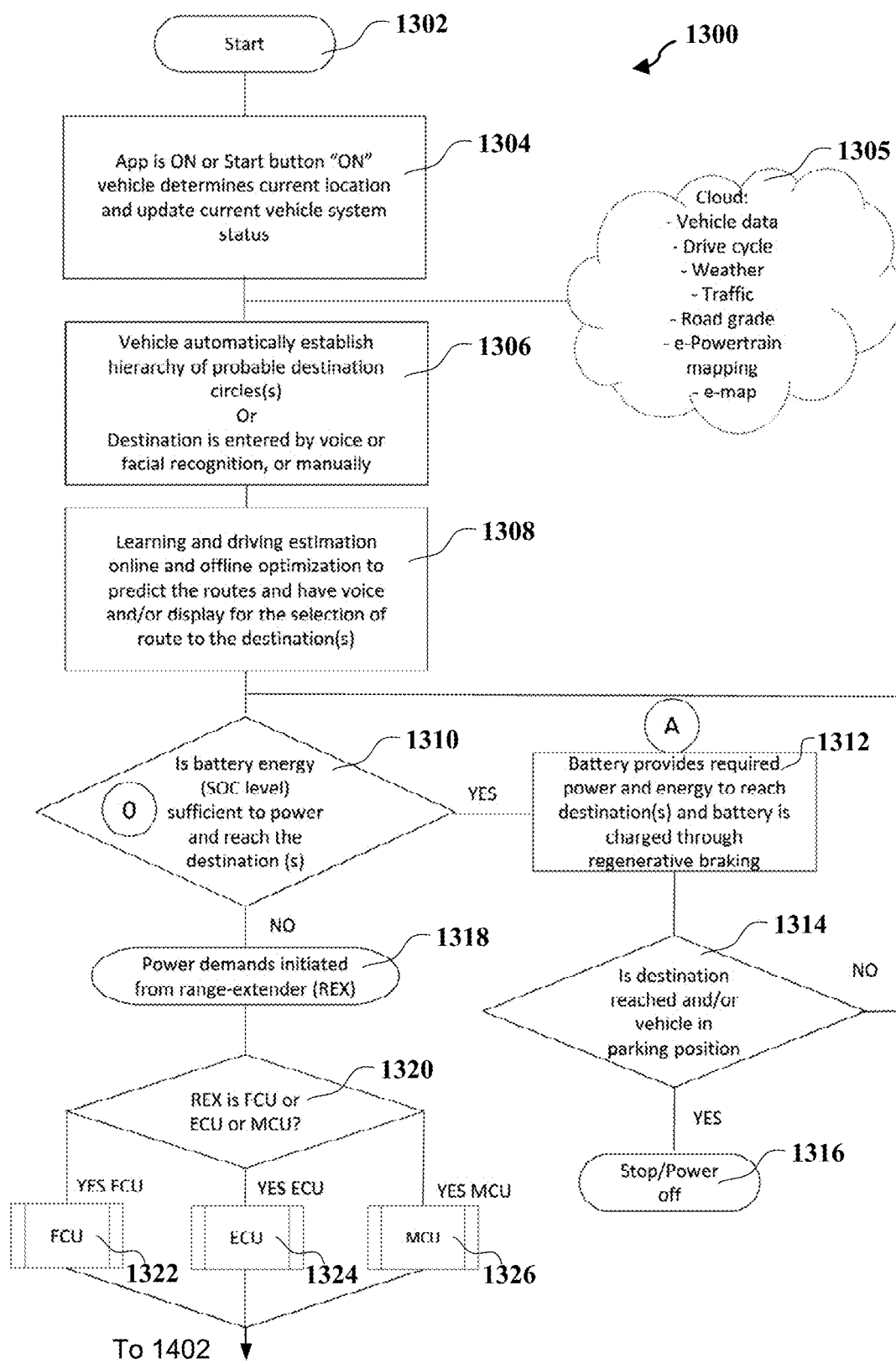
FIG. 13 and FIG. 14 show schematically a method of controlling and operation of a range-extended electric vehicle according to embodiments of the invention.
Figure 14:
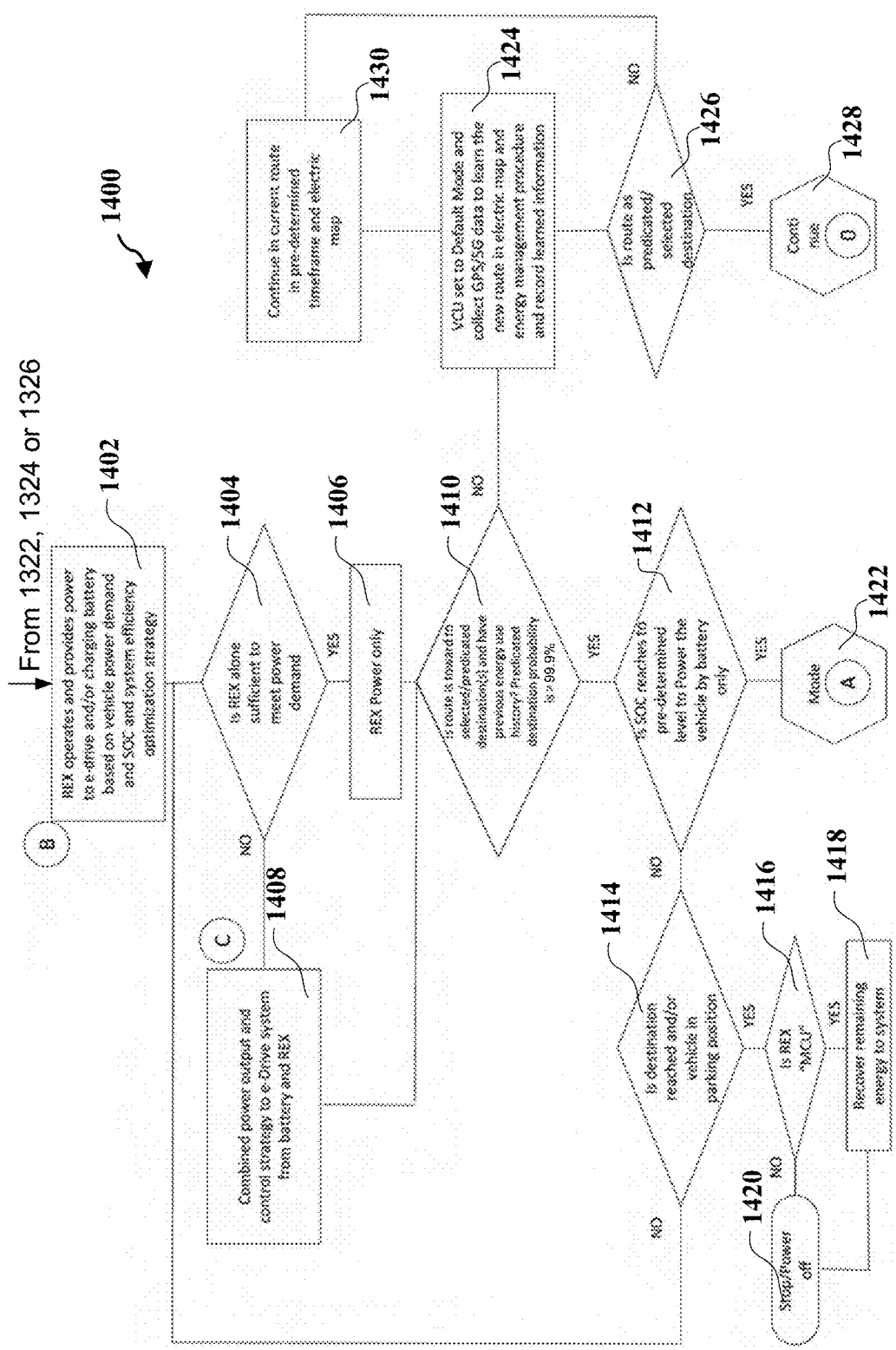

Referring to FIGS. 13 and 14, a method of controlling and operation of a range-extended electric vehicle is schematically shown according to embodiments of the invention.

In the exemplary embodiment shown in FIG. 13, the method starts at step 1302. At step 1304, the range-extended electric vehicle (e.g., the range-extended electric vehicle 100) is started (either the "Start" button is "ON' or the control application is "ON"), and the range-extended electric vehicle determines current location of itself and updates current vehicle system status. At step 1305, the range-extended electric vehicle communicates, in a wireless manner, with a database on the cloud, and the database on the cloud includes key information associated with the range-extended electric vehicle such as vehicle data, drive cycle, weather information, traffic information, road information (e.g., road grade), e-powertrain mapping, and electric map. It should be noted that the database on the cloud may include other key information associated with the range-extended electric vehicle, depending on manufacturer configurations and driver customization.

At step 1306, the range-extended electric vehicle automatically establish hierarchy of probable destination circle (s) based on the key information associated with the range-extended electric vehicle. Alternatively, destination is entered by voice or facial recognition, or entered manually by the driver. At step 1308, after knowing the destination, the range-extended electric vehicle uses learning and driving estimation online and offline optimization to predict potential routes, and presents, by voice and/or display, the predicted potential routes for the driver to select one route among all the predicted potential routes. It should be noted that multiple destinations are supported at step 1306 and step 1308. For example, the driver may enter a first destination and a second destination, meaning that the driver intends to go to the second destination after arriving at the first destination.

At step 1310, the range-extended electric vehicle determines whether battery energy (i.e., state of charge level) is sufficient to power the range-extended electric vehicle to reach the destination.

When it is determined that battery energy is sufficient to power the range-extended electric vehicle to reach the destination, then the LTO battery pack (e.g., the LTO battery pack 131) provides required power and energy to reach the destination (as shown in FIG. 3), and in the meantime the LTO battery pack is charged through regenerative braking energy as much as possible (as shown in FIG. 4). At step 1314, the range-extended electric vehicle further determines whether the destination is reached and whether the range-extended electric vehicle is in a parking position. When it is determined that the range-extended electric vehicle reaches the destination and the range-extended electric vehicle is in a parking position, at step 1316, the range-extended electric vehicle stops and the power is off. When it is determined that the range-extended electric vehicle does not reach the destination or the range-extended electric vehicle is not in a parking position, the method proceeds back to step 1310.

On the other hand, when it is determined that battery energy is insufficient to power the range-extended electric vehicle to reach the destination, at step 1318, the range-extended electric vehicle initiates power demands from its range extender (e.g., the range extender 121). At step 1320, the range-extended electric vehicle determines whether the range extender is a fuel-cell range extender (e.g., the fuel-cell range extender 1204), an ICE range extender (e.g., the ICE range extender 1202) or a microturbine range extender (e.g., the microturbine range extender 1206). At step 1322, the range-extended electric vehicle determines that the range extender is a fuel-cell range extender (i.e., it's a fuel-cell control unit (FCU)). At step 1324, the range-extended electric vehicle determines that the range extender is an ICE range extender (i.e., it's an engine control unit (ECU)). At step 1326, the range-extended electric vehicle determines that the range extender is a microturbine range extender (i.e., it's a Microturbine control unit (MCU)). Step 1322, step 1324 and step 1326 are followed by step 1402 in FIG. 14.

In the exemplary embodiment shown in FIG. 14, the method starts at step 1402. At step 1402, the range extender operates and provides power to the electric drive component (e.g., the electric drive component 134) of the range-extended electric vehicle (as shown in FIG. 5) and/or charges the LTO battery pack based on vehicle power demands, battery state of charge and system efficiency optimization strategy (as shown in FIG. 9).

At step 1404, the range-extended electric vehicle determines whether the range extender alone is sufficient to meet the power demands. When the range-extended electric vehicle determines that the range extender alone is sufficient to meet the power demands, at step 1406, the range-extended electric vehicle uses the power of the range extender only. When the range-extended electric vehicle determines that the range extender alone is insufficient to meet the power demands, at step 1408, the range-extended electric vehicle adopts a combined power output and control strategy. In other words, the range-extended electric vehicle uses power from both the LTO battery pack and the range extender.

At step 1410, the range-extended electric vehicle determines whether the actual route is toward the selected or predicted destination and whether there is previous energy use history available. When the range-extended electric vehicle determines (e.g., with a probability higher than 99.9%) that the actual route is toward the selected or predicted destination and there is previous energy use history available, at step 1412, the range-extended electric vehicle determines whether the battery state of charge reaches a predetermined level to power the range-extended electric vehicle by the LTO battery pack alone. When the range-extended electric vehicle determines that the battery state of charge reaches a predetermined level to power the range-extended electric vehicle by the LTO battery pack alone, at step 1422, the method proceeds to step 1312 again.

On the other hand, when the range-extended electric vehicle determines that the battery state of charge does not reach a predetermined level to power the range-extended electric vehicle by the LTO battery pack alone, at step 1414, the range-extended electric vehicle determines whether the destination is reached and whether the range-extended electric vehicle is in a parking position.

When the range-extended electric vehicle determines that the destination is not reached or the range-extended electric vehicle is not in a parking position, the method proceeds back to step 1404.

When the range-extended electric vehicle determines that the destination is reached and the range-extended electric vehicle is in a parking position, at step 1416, the range-extended electric vehicle determines whether the range extender is a microturbine range extender. When the range-extended electric vehicle determines that the range extender is a microturbine range extender, at step 1418, the range-extended electric vehicle recovers the remaining energy that is being generated by micorturbine during fuel-off process from 75,000+ rpm to 0 rpm to the system. When the range-extended electric vehicle determines that the range extender is not a microturbine range extender, at step 1420, the range-extended electric vehicle stops and the power is off.

On the other hand, when the range-extended electric vehicle determines (e.g., with a probability higher than 99.9%), at step 1410, that the actual route is not toward the selected or predicted destination or there is previous energy use history available, at step 1424, the range-extended electric vehicle sets the vehicle control unit (VCU) to a default mode (as shown in FIG. 2) and collects GPS data and 5G data to learn the new route in electric map, energy management procedure and record new routine information.

At step 1426, the range-extended electric vehicle determines whether the route is toward the selected/predicted destination. When the range-extended electric vehicle determines that the route is toward the selected/predicted destination, at step 1428, the method proceeds to step 1310.

On the other hand, when the range-extended electric vehicle determines that the route is not toward the selected/predicted destination, at step 1430, the range-extended electric vehicle continues in the current route in predetermined timeframe and electric map. Then the method proceeds to step 1424.

In one or more example embodiments, the method and functions described may be implemented in hardware, software, or any combination thereof. If implemented in software, the method and functions may be stored on or encoded as one or more instructions or code on a non-transitory computer-readable medium, such that, when the one or more instructions or code are executed by one or more processors, the execution of the one or more instructions or code causes the above method for controlling an electric vehicle to be performed. The non-transitory computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. An electric vehicle, comprising:
an electric drive component;
a lithium titanate oxide (LTO) battery pack comprising LTO battery cells, electrically connected through a power distribution unit to the electric drive component; and
a range extender, electrically connected through a rectifier to the LTO battery pack and the electric drive component, the range extender having a first state in which it operates to deliver power to the electric drive component, a second state in which it operates to charge the LTO battery pack, a third state in which it operates to deliver power to the electric drive component and charge the LTO battery pack, and a fourth state in which it does not deliver power outward;
wherein the electric drive component has a first state in which it operates to receive power delivered from the LTO battery pack to drive wheels of the electric vehicle, a second state in which it operates to receive power delivered from the range extender to drive the wheels, a third state in which it operates to receiver power delivered from the LTO battery pack and the range extender to drive the wheels, a fourth state in which it operates to recover braking energy to charge the LTO battery pack, and a fifth state in which it does not receive power and does not recover the braking energy.

2. The electric vehicle of claim 1, wherein each of the LTO battery cells comprises $Li_4Ti_5O_{12}$.

3. The electric vehicle of claim 1, wherein the LTO battery cells have a charge rate being greater than 25 C and a discharge rate being greater than 25 C.

4. The electric vehicle of claim 3, wherein the LTO battery cells have a charge rate of 30 C and a discharge rate of 30 C.

5. The electric vehicle of claim 1, wherein the LTO battery cells have a recharge efficiency being greater than 98%.

6. The electric vehicle of claim 1, wherein the range extender is in the fourth state in which it does not deliver power outward, and the electric drive component is in the first state in which it operates to receive power delivered from the LTO battery pack to drive the wheels.

7. The electric vehicle of claim 1, wherein the range extender is in the fourth state in which it does not deliver power outward, and the electric drive component is in the fourth state in which it operates to recover braking energy to charge the LTO battery pack.

8. The electric vehicle of claim 1, wherein the range extender is in the first state in which in which it operates to deliver power to the electric drive component, and the electric drive component is in the second state in which it operates to receive power delivered from the range extender to drive the wheels.

9. The electric vehicle of claim 1, wherein the range extender is in the third state in which it operates to deliver power to the electric drive component and charge the LTO battery pack, and the electric drive component is in the second state in which it operates to receive power delivered from the range extender to drive the wheels.

10. The electric vehicle of claim 1, wherein the range extender is in the first state in which it operates to deliver power to the electric drive component, and the electric drive component is in the third state in which it operates to receiver power delivered from the LTO battery pack and the range extender to drive the wheels.

11. The electric vehicle of claim 1, wherein the range extender is in the second state in which it operates to charge the LTO battery pack, and the electric drive component is in the fourth state in which it operates to recover braking energy to charge the LTO battery pack.

12. The electric vehicle of claim 1, wherein the range extender is in the second state in which it operates to charge the LTO battery pack, and the electric drive component is in the fifth state in which it does not receive power and does not recover the braking energy.

13. The electric vehicle of claim 1, wherein the range extender is one of an internal combustion engine (ICE) range extender, a fuel-cell range extender, and a microturbine range extender.

14. An architecture of the electric vehicle of claim 1, being configured to accommodate any one of the ICE range extender, the fuel-cell range extender, and the microturbine range extender.

15. The architecture of claim 14, comprising a rectangular cuboid space in a front part for accommodating any one of the ICE range extender, the fuel-cell range extender, and the microturbine range extender.

* * * * *